United States Patent
Tatsuta et al.

(10) Patent No.: US 11,076,645 B2
(45) Date of Patent: Aug. 3, 2021

(54) POWER SUPPLY UNIT FOR AEROSOL INHALER

(71) Applicant: JAPAN TOBACCO INC., Tokyo (JP)

(72) Inventors: Nobuhiro Tatsuta, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/088,595

(22) Filed: Nov. 4, 2020

(65) Prior Publication Data

US 2021/0127754 A1    May 6, 2021

(30) Foreign Application Priority Data

Nov. 5, 2019 (JP) .............................. JP2019-201068

(51) Int. Cl.
  *A24F 40/90* (2020.01)
  *A24F 40/50* (2020.01)
  *H02J 7/00* (2006.01)
  *H02J 50/10* (2016.01)

(52) U.S. Cl.
  CPC .............. *A24F 40/90* (2020.01); *A24F 40/50* (2020.01); *H02J 7/0044* (2013.01); *H02J 50/10* (2016.02)

(58) Field of Classification Search
  CPC ...... A61B 5/6893; A24F 40/46; H01M 10/44; B60L 53/122
  See application file for complete search history.

(56) References Cited

U.S. PATENT DOCUMENTS

| | | | |
|---|---|---|---|
| 8,881,737 B2 * | 11/2014 | Collett | A24F 40/46 131/273 |
| 9,680,328 B2 * | 6/2017 | Akiyoshi | H01M 10/44 |
| 9,806,535 B2 * | 10/2017 | Nakashima | B60L 53/122 |
| 2011/0156636 A1 | 6/2011 | Kim | |
| 2011/0265806 A1 | 11/2011 | Alarcon et al. | |
| 2013/0300350 A1 | 11/2013 | Xiang | |
| 2014/0060554 A1 | 3/2014 | Collett et al. | |
| 2014/0224267 A1 | 8/2014 | Levitz et al. | |
| 2014/0300312 A1 | 10/2014 | Akiyoshi et al. | |
| 2015/0027459 A1 | 1/2015 | Collett et al. | |
| 2015/0053214 A1 | 2/2015 | Alarcon et al. | |
| 2015/0059779 A1 | 3/2015 | Alarcon et al. | |

(Continued)

FOREIGN PATENT DOCUMENTS

| JP | 2007-336710 A | 12/2007 |
|---|---|---|
| JP | 5767342 B2 | 8/2015 |

(Continued)

OTHER PUBLICATIONS

Notice of Reasons for Refusal received for Japanese Patent Application No. 2019-201068, dated Dec. 17, 2019, 5 pages including English Translation.

(Continued)

*Primary Examiner* — Jean F Duverne
(74) *Attorney, Agent, or Firm* — Xsensus LLP

(57) ABSTRACT

A power supply unit for an aerosol inhaler includes: a power supply capable of supplying power to a load capable of generating aerosol from an aerosol source; and a connector serving as a physical and electrical contact with an external power supply, in which the power supply unit for the aerosol inhaler further includes: a power reception coil capable of receiving the power in a wireless manner.

14 Claims, 14 Drawing Sheets

(56) References Cited

U.S. PATENT DOCUMENTS

| | | |
|---|---|---|
| 2015/0200547 A1 | 7/2015 | Nakashima et al. |
| 2018/0140021 A1 | 5/2018 | Alarcon et al. |
| 2018/0146712 A1 | 5/2018 | Alarcon et al. |
| 2018/0192709 A1 | 7/2018 | Alarcon et al. |
| 2018/0242645 A1 | 8/2018 | Alarcon et al. |
| 2018/0263290 A1 | 9/2018 | Collett et al. |
| 2018/0271156 A1 | 9/2018 | Alarcon et al. |
| 2019/0380390 A1 | 12/2019 | Jeong et al. |
| 2020/0138107 A1 | 5/2020 | Collett et al. |
| 2020/0196670 A1 | 6/2020 | Alarcon et al. |
| 2020/0275711 A9 | 9/2020 | Alarcon et al. |
| 2020/0352255 A1 | 11/2020 | Jeong et al. |

FOREIGN PATENT DOCUMENTS

| | | |
|---|---|---|
| JP | 2015-532828 A | 11/2015 |
| JP | 6326188 B2 | 5/2018 |
| KR | 10-2015-0134332 A | 12/2015 |
| KR | 10-2019-0020720 A | 3/2019 |
| WO | 2013/094469 A1 | 6/2013 |
| WO | 2014/010518 A1 | 1/2014 |

OTHER PUBLICATIONS

Decision to Grant a Patent received for Japanese Patent Application No. 2019-201068, dated Feb. 25, 2020, 6 pages including English Translation.
Korean Office Action dated Jan. 22, 2021, in corresponding Korean Patent Application No. 10-2020-0144214.
European search report dated Mar. 19, 2021, in corresponding European patent Application No. 20205395.5, 3 pages.

\* cited by examiner

POWER SUPPLY UNIT FOR AEROSOL INHALER

CROSS REFERENCE TO RELATED APPLICATIONS

This application claims priority to Japanese Patent Application No. 2019-201068 filed on Nov. 5, 2019, the content of which is incorporated herein by reference.

TECHNICAL FIELD

The present invention relates to a power supply unit for an aerosol inhaler.

BACKGROUND ART

A power supply unit for an aerosol inhaler capable of wired charging or wireless charging has been known (JP 6326188 B and JP 5767342 B). For example, JP 6326188 B discloses that the power supply unit for an electronic smoking device may be a wireless type induction charging system or a contact type charging system. JP 5767342 B discloses a specific circuit configuration for wireless charging including a power reception coil that receives power in a wireless manner, a diode and a capacitor that rectify the received power, a Zener diode that stabilizes a voltage and the like.

Since only one of the wired charging and the wireless charging can be performed in the related-art power supply unit for the aerosol inhaler, charging opportunities may are restricted, and use may be restricted due to insufficient charging.

An object of the present invention is to provide a power supply unit for an aerosol inhaler capable of increasing charging opportunities of the power supply unit and preventing use restriction due to insufficient charging.

SUMMARY OF INVENTION

According to an aspect of the present invention, a power supply unit for an aerosol inhaler includes: a power supply capable of supplying power to a load capable of generating aerosol from an aerosol source; and a connector serving as a physical and electrical contact with an external power supply, in which the power supply unit for the aerosol inhaler further includes a power reception coil capable of receiving the power in a wireless manner.

DESCRIPTION OF EMBODIMENTS

Hereinafter, a power supply unit for an aerosol inhaler and the aerosol inhaler according to each embodiment of the present invention will be described.

(Aerosol Inhaler)

Figure 1:
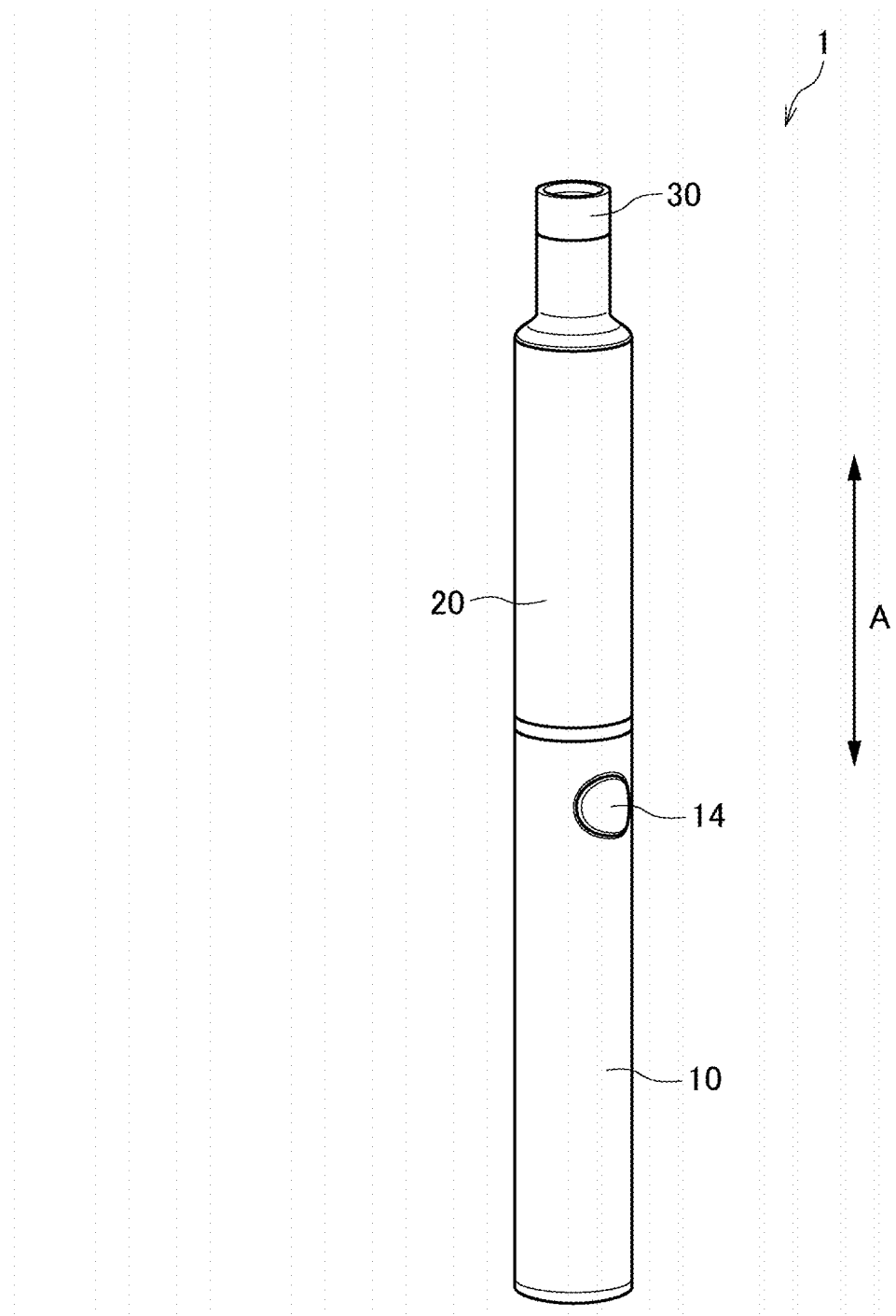
FIG. 1 is a perspective view of an aerosol inhaler equipped with a power supply unit according to an embodiment of the present invention.

An aerosol inhaler 1 is a device for inhaling a flavor without combustion, and has a rod shape extending along a predetermined direction (hereinafter referred to as a longitudinal direction A). As shown in FIG. 1, the aerosol inhaler 1 is provided with a power supply unit 10, a first cartridge 20 and a second cartridge 30 in this order along the longitudinal direction A. The first cartridge 20 is attachable to and detachable from the power supply unit 10, and the second cartridge 30 is attachable to and detachable from the first cartridge 20. In other words, the first cartridge 20 and the second cartridge 30 are replaceable.

First Embodiment (Power Supply Unit)

Figure 2:
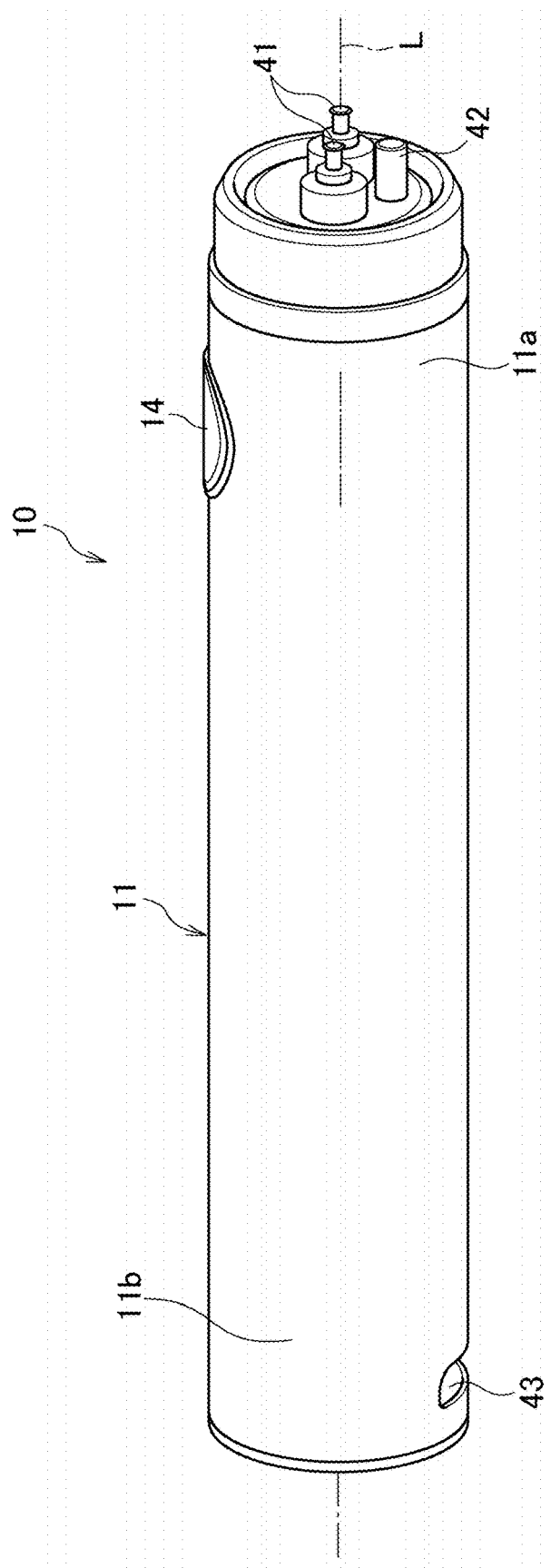
FIG. 2 is a perspective view of the power supply unit of the aerosol inhaler shown in FIG. 1.
Figure 3:
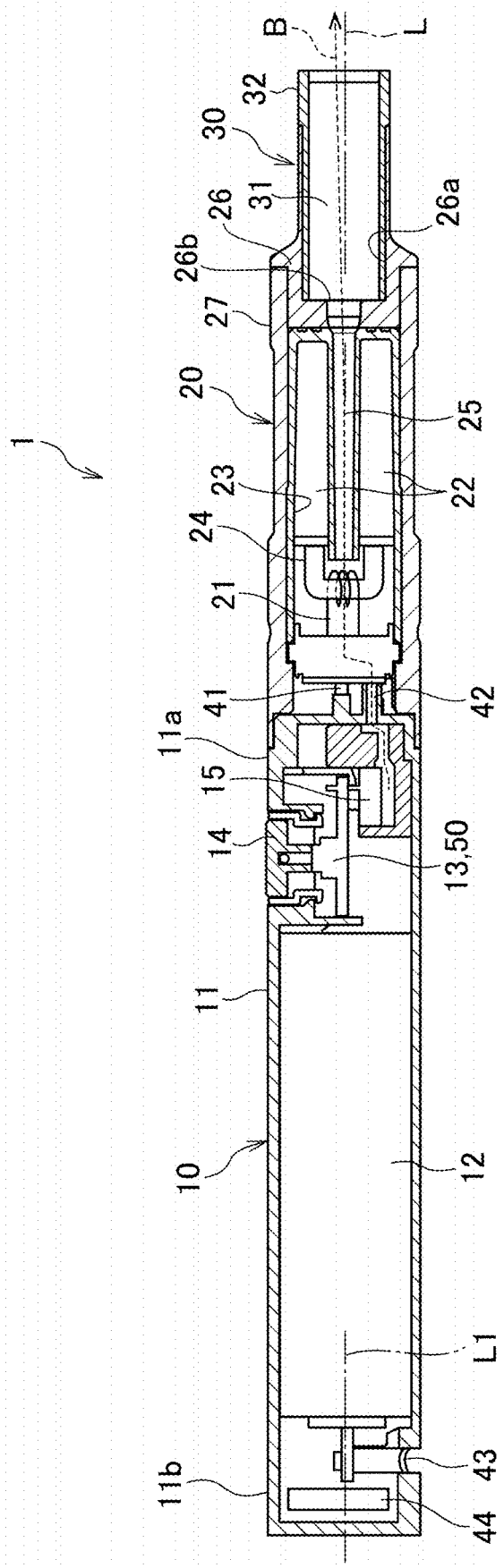
FIG. 3 is a sectional view of the aerosol inhaler shown in FIG. 1.

As shown in FIGS. 2 and 3, the power supply unit 10 according to a first embodiment accommodates a power supply 12, a charger 13, a control unit 50, various sensors and the like inside a cylindrical power supply unit case 11.

Discharge terminals 41 are provided on a top portion 11*a* located on one end side (a first cartridge 20 side) of the power supply unit case 11 in the longitudinal direction A. The discharge terminals 41 are provided so as to protrude from an upper surface of the top portion 11*a* toward the first cartridge 20, and are configured to be electrically connectable to a load 21 of the first cartridge 20.

An air supply portion 42 that supplies air to the load 21 of the first cartridge 20 is provided on the upper surface of the top portion 11*a* in vicinity of the discharge terminals 41.

A charging terminal 43 that is electrically connectable to an external power supply 60 (see FIG. 5) capable of charging the power supply 12 is provided on a bottom portion 11*b* located on the other end side (a side opposite to the first cartridge 20) of the power supply unit case 11 in the longitudinal direction A. The charging terminal 43 is provided on a side surface of the bottom portion 11*b*, and at least one of a USB terminal, a microUSB terminal and a Lightning (registered trademark) terminal can be connected thereto.

A power reception coil 44 for charging the power supply 12 in a wireless state with the external power supply (not shown) and a rectifier 46 that converts AC power received by the power reception coil 44 into DC power are accommodated in the bottom portion 11b of the power supply unit case 11. That is, since both wireless charging and wired charging can be performed as a charging method of the power supply 12, charging opportunities of the power supply unit 10 can be increased and use restriction due to insufficient charging can be prevented. A method of wireless power transfer may be an electromagnetic induction method, a magnetic resonance method, a combination of the electromagnetic induction method and the magnetic resonance method, or other methods. In any method of wireless power transfer, the power supply unit case 11 may or may not be in physical contact with the external power supply. In the present specification, the wireless power transfer is treated as being synonymous with non-contact power transfer.

A user-operable operation unit 14 is provided on a side surface of the top portion 11a of the power supply unit case 11. The operation unit 14 includes a button type switch, a touch panel and the like, and is used when the control unit 50 and various sensors are activated or shut off, which reflects intention of a user.

The power supply 12 is a rechargeable secondary battery, and is preferably a lithium ion secondary battery. The charger 13 controls charging power input from the rectifier 46 to the power supply 12. The charger 13 is configured by using a charging IC including a DC-DC converter, a voltmeter, a ammeter, a processor and the like.

Figure 4:
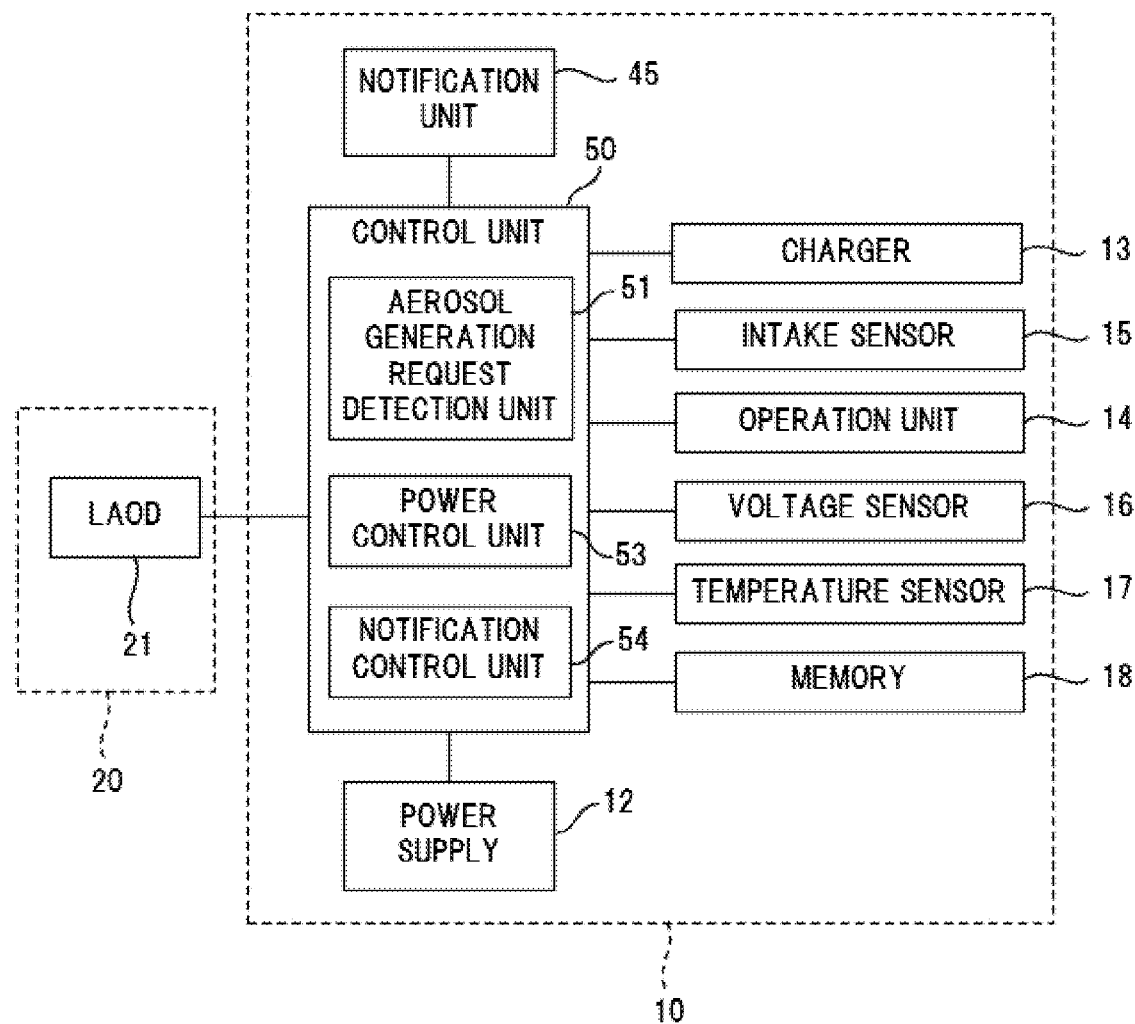
FIG. 4 is a block diagram showing a main part configuration of the power supply unit of the aerosol inhaler shown in FIG. 1.

As shown in FIG. 4, the control unit 50 is connected to the charger 13, the operation unit 14, various sensor devices such as an intake sensor 15 that detects a puff (intake) operation, a voltage sensor 16 that measures a voltage of the power supply 12, a temperature sensor 17 that detects a temperature, and a memory 18 that stores the number of puff operations or time for energizing the load 21. The control unit 50 performs various controls on the aerosol inhaler 1. The intake sensor 15 may be constituted by a condenser microphone, a pressure sensor or the like. Specifically, the control unit 50 is a processor (MCU: micro controller unit). More specifically, a structure of the processor is an electric circuit obtained by combining circuit elements such as semiconductor elements.

(First Cartridge)

As shown in FIG. 3, the first cartridge 20 includes, inside a cylindrical cartridge case 27, a reservoir 23 that stores an aerosol source 22, the electric load 21 that atomizes the aerosol source 22, a wick 24 that draws the aerosol source from the reservoir 23 to the load 21, an aerosol flow path 25 in which aerosol generated by atomization of the aerosol source 22 flows toward the second cartridge 30, and an end cap 26 that accommodates a part of the second cartridge 30.

The reservoir 23 is partitioned and formed so as to surround a periphery of the aerosol flow path 25, and stores the aerosol source 22. A porous body such as a resin web or cotton may be accommodated in the reservoir 23, and the aerosol source 22 may be impregnated in the porous body. The reservoir 23 may only store the aerosol source 22 without accommodating the porous body such as the resin web or the cotton. The aerosol source 22 includes a liquid such as glycerin, propylene glycol or water.

The wick 24 is a liquid holding member that draws the aerosol source 22 from the reservoir 23 to the load 21 by using a capillary phenomenon, and is formed of, for example, glass fiber or porous ceramic.

The load 21 atomizes the aerosol source 22 without combustion with the power supplied from the power supply 12 via the discharge terminals 41. The load 21 is formed of an electric heating wire (coil) wound at a predetermined pitch. The load 21 may be any element capable of generating the aerosol by atomizing the aerosol source 22, and is, for example, a heating element or an ultrasonic generator. Examples of the heating element include a heating resistor, a ceramic heater and an induction heating type heater.

The aerosol flow path 25 is provided on a downstream side of the load 21 and on a center line L of the power supply unit 10.

The end cap 26 includes a cartridge accommodation portion 26a that accommodates a part of the second cartridge 30, and a communication path 26b that allows the aerosol flow path 25 and the cartridge accommodation portion 26a to communicate with each other.

(Second Cartridge)

The second cartridge 30 stores a flavor source 31. The second cartridge 30 is detachably accommodated in the cartridge accommodation portion 26a provided in the end cap 26 of the first cartridge 20. An end portion of the second cartridge 30 on a side opposite to the first cartridge 20 is a suction port 32 for the user. The suction port 32 is not limited to being integrally formed with the second cartridge 30, but may be configured to be attachable to and detachable from the second cartridge 30. By configuring the suction port 32 separately from the power supply unit 10 and the first cartridge 20 in this way, the suction port 32 can be kept hygienic.

The second cartridge 30 imparts the flavor to the aerosol by passing the aerosol generated by atomizing the aerosol source 22 by the load 21 through the flavor source 31. As a raw material piece constituting the flavor source 31, chopped tobacco or a molded product obtained by molding a tobacco raw material into particles can be used. The flavor source 31 may be formed of a plant other than tobacco (for example, mint, Chinese herb or herb). The flavor source 31 may be provided with a fragrance such as menthol.

In the aerosol inhaler 1 according to the present embodiment, the aerosol to which the flavor is added can be generated by the aerosol source 22, the flavor source 31 and the load 21. That is, the aerosol source 22 and the flavor source 31 can be referred to as an aerosol generation source that generates the aerosol.

In addition to a configuration in which the aerosol source 22 and the flavor source 31 are separated from each other, a configuration in which the aerosol source 22 and the flavor source 31 are integrally formed, a configuration in which the flavor source 31 is omitted and substances that may be included in the flavor source 31 are added to the aerosol source 22, or a configuration in which a drug, a Chinese herb or the like instead of the flavor source 31 is added to the aerosol source 22 may also be employed as the configuration of the aerosol generation source used in the aerosol inhaler 1.

In the aerosol inhaler 1 configured as described above, as shown by an arrow B in FIG. 3, the air flowing in from an air intake port (not shown) provided in the power supply unit case 11 passes through vicinity of the load 21 of the first cartridge 20 from the air supply portion 42. The load 21 atomizes the aerosol source 22 drawn or moved from the reservoir 23 by the wick 24. The aerosol generated by atomization flows through the aerosol flow path 25 together with the air flowing in from the air intake port, and is supplied to the second cartridge 30 via the communication path 26b. The aerosol supplied to the second cartridge 30 is imparted the flavor by passing through the flavor source 31, and is supplied to the suction port 32.

The aerosol inhaler 1 is provided with a notification unit 45 that notifies various types of information. The notification unit 45 may be constituted by a light emitting element, a vibration element or a sound output element. The notification unit 45 may also be a combination of two or more elements among the light emitting element, the vibration element and the sound output element. The notification unit 45 may be provided in any of the power supply unit 10, the first cartridge 20 and the second cartridge 30, but is preferably provided in the power supply unit 10 in order to shorten a conductive wire from the power supply 12. For example, a periphery of the operation unit 14 is translucent, and is configured to emit light by a light emitting element such as an LED.

(Charge and Discharge Control Circuit)

Next, a charge and discharge control circuit 40 of the power supply unit 10 will be described with reference to FIG. 5.

The charge and discharge control circuit 40 includes: a positive electrode side discharge terminal 41a and a negative electrode side discharge terminal 41b constituting the discharge terminal 41; a positive electrode side charging terminal 43a and a negative electrode side charging terminal 43b constituting the charging terminal 43; the control unit 50 connected between a positive electrode side of the power supply 12 and the positive electrode side discharge terminal 41a and between a negative electrode side of the power supply 12 and the negative electrode side discharge terminal 41b; the charger 13 connected between the positive electrode side of the power supply 12 and the positive electrode side charging terminal 43a and between the negative electrode side of the power supply 12 and the negative electrode side charging terminal 43b; the voltage sensor 16 connected in parallel with the power supply 12; a wired charging circuit 47 that connects the charging terminal 43 to the charger 13; a wireless charging circuit 48 that connects the power reception coil 44 and the rectifier 46 to the charger 13; and a discharge switch 19 arranged on a power transmission path between the power supply 12 and the discharge terminal 41. The switch 19 is formed of, for example, a MOSFET, and is controlled to be opened and closed by the control unit 50 adjusting a gate voltage.

(Control Unit)

As shown in FIG. 4, the control unit 50 includes an aerosol generation request detection unit 51, a power control unit 53 and a notification control unit 54.

The aerosol generation request detection unit 51 detects an aerosol generation request based on an output result of the intake sensor 15. The intake sensor 15 is configured to output a value of a change in pressure in the power supply unit 10 caused by suction of the user through the suction port 32. The intake sensor 15 is, for example, a pressure sensor that outputs an output value (for example, a voltage value or a current value) corresponding to an air pressure that changes due to a flow rate of the air sucked from the air intake port toward the suction port 32 (that is, the puff operation of the user). The intake sensor may be configured to determine whether the detected flow rate or pressure of the air can correspond to the puff operation of the user and output one of an ON value and an OFF value.

The notification control unit 54 controls the notification unit 45 to notify various types of information. For example, the notification control unit 54 controls the notification unit 45 to notify a replacement timing of the second cartridge 30 according to detection of the replacement timing of the second cartridge 30. The notification control unit 54 notifies the replacement timing of the second cartridge 30 based on the number of the puff operations or the cumulative time for energizing the load 21 stored in the memory 18. The notification control unit 54 may notify not only the replacement timing of the second cartridge 30, but also a replacement timing of the first cartridge 20, a replacement timing of the power supply 12, a charging timing of the power supply 12 and the like.

When the aerosol generation request detection unit 51 detects the aerosol generation request, the power control unit 53 controls discharge of the power supply 12 via the discharge terminals 41 by turning on or turning off the switch 19.

The power control unit 53 performs control such that an amount of the aerosol generated by atomizing the aerosol source by the load 21 falls within a desired range, in other words, an amount of the power supplied from the power supply 12 to the load 21 falls within a certain range. Specifically, the power control unit 53 controls on/off of the switch 19 by, for example, pulse width modulation (PWM) control. Instead of this, the power control unit 53 may control the on/off of the switch 19 by pulse frequency modulation (PFM) control.

The power control unit 53 may stop power supply from the power supply 12 to the load 21 when a predetermined period has elapsed since the power supply to the load 21 is started. In other words, the power control unit 53 stops the power supply from the power supply 12 to the load 21 when a puff period exceeds the predetermined period even within the puff period when the user actually performs the puff operation. The predetermined period is set in order to reduce variations in the puff period of the user. The power control unit 53 controls a duty ratio of the on/off of the switch 19 during one puff operation according to an amount of electricity stored in the power supply 12. For example, the power control unit 53 controls an on-time interval (a pulse interval) for supplying power from the power supply 12 to the load 21, and controls an on-time length (a pulse width) for supplying power from the power supply 12 to the load 21.

The power control unit 53 detects electrical connection between the charging terminal 43 and the external power supply 60 or power reception by the power reception coil 44, and controls charging of the power supply 12 via the charger 13.

(Wired Charging Circuit and Wireless Charging Circuit)

Figure 5:
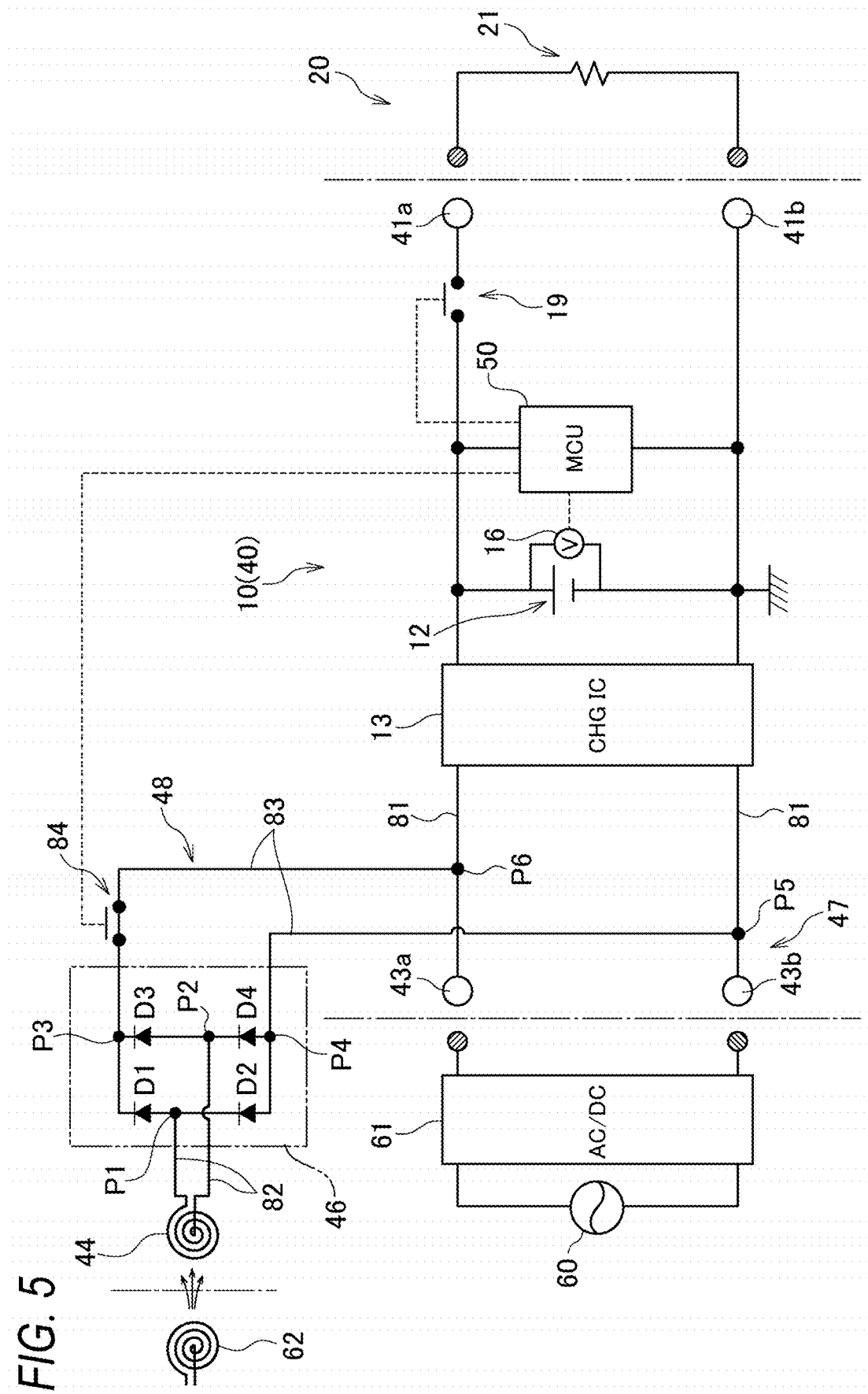
FIG. 5 is a schematic diagram showing a circuit configuration of the power supply unit of the aerosol inhaler shown in FIG. 1.

As shown in FIG. 5, the charging terminal 43 (the wired charging circuit 47) and the power reception coil 44 (the wireless charging circuit 48) are connected in parallel to the charger 13. That is, the charging terminal 43 and the power reception coil 44 are connected to the same charger 13. Thereby, since the charger 13 is used for both the wired charging and the wireless charging, the power supply unit 10 can be prevented from increasing in size, weight and cost even if the power supply unit 10 is capable of both the wired charging and wireless charging. The rectifier 46 described below is provided between the power reception coil 44 and the charger 13. Also in such a circuit configuration, the power reception coil 44 is connected in parallel with the charging terminal 43 to the charger 13 via the rectifier 46.

A part of a circuit that connects the charging terminal 43 to the charger 13 and a part of a circuit that connects the power reception coil 44 to the charger 13 are made common. Specifically, charger 13 sides of the wired charging circuit 47 and the wireless charging circuit 48 are connected at a fifth connection point P5 and a sixth connection point P6, and are connected to the charger 13 via a common connection line 81 serving as a DC conductive wire. In this way, since a part of the circuit connected to the charger 13 is made common, the power supply unit 10 can be further prevented from increasing in size, weight and cost.

In addition, the part of the circuit that connects the charging terminal 43 to the charger 13 and the part of the circuit that connects the power reception coil 44 to the charger 13 are preferably formed on the same flexible printed circuit board (not shown). This is because, by using the flexible printed circuit board, it is possible to improve degree of freedom of arrangement while preventing the power supply unit 10 from increasing in size, weight and cost. For example, by forming the common connection line 81 on the flexible printed circuit board, the common connection line 81 can be arranged along the cylindrical power supply unit case 11.

As shown in FIG. 5, the wired charging circuit 47 is connected to a external power supply 60 side via the charging terminal 43. The external power supply 60 is, for example, a household AC power supply, and power converted to a direct current by the AC/DC converter 61 is input to the charger 13 via the charging terminal 43, the wired charging circuit 47 and the common connection line 81. The external power supply 60 may be a DC power supply.

As shown in FIG. 5, the wireless charging circuit 48 includes the power reception coil 44, the rectifier 46, an AC conductive wire 82, a DC conductive wire 83 and a switch 84.

Figure 12:
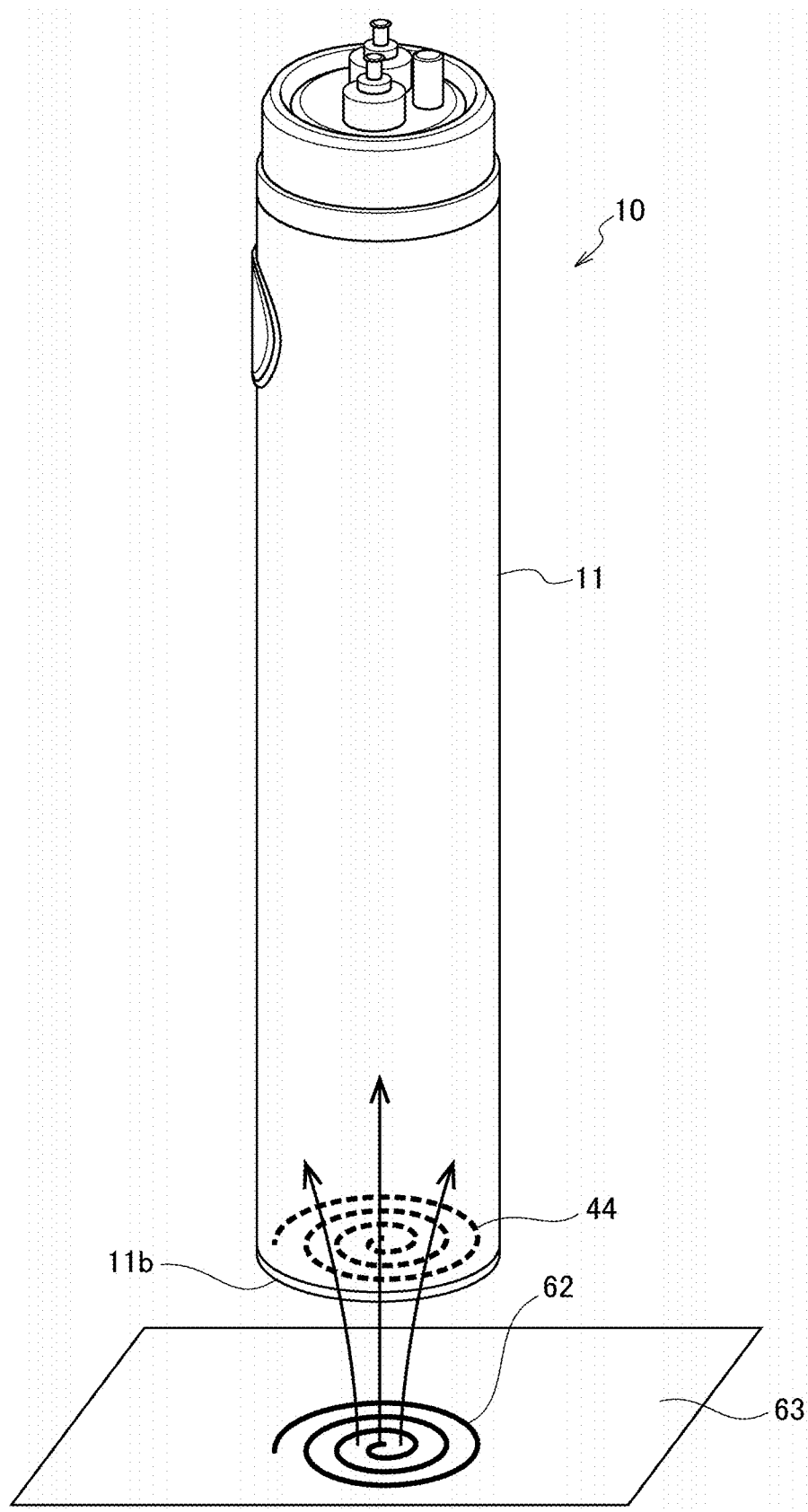
FIG. 12 is a perspective view schematically showing a state of wireless charging of the power supply unit of the aerosol inhaler shown in FIG. 1.

As shown in FIG. 3, the power reception coil 44 is arranged in the bottom portion 11b of the power supply unit case 11 such that a coil winding axis center line L1 is along the center line L of the power supply unit case 11 in a length direction. During charging, the power reception coil 44 is arranged close to a power transmission coil 62 that is excited by the AC power from the external power supply in the wireless manner, and receives the AC power from the power transmission coil 62. For example, as shown in FIG. 12, in the power supply unit 10 according to the present embodiment, when the power supply unit case 11 is placed vertically, with the bottom portion 11b thereof facing downward, above a charging mat 63 in which the power transmission coil 62 is installed (hereinafter referred to as vertical placement as appropriate), the power reception coil 44 comes close to the power transmission coil 62 of the charging mat 63 in the wireless manner, and the power can be received from the power transmission coil 62. "Vertically" means that the longitudinal direction is placed in a substantially vertical direction.

As shown in FIG. 3, the power reception coil 44 and the charging terminal 43 are arranged below the power supply 12 in the vertical direction in a vertical placement posture as a posture during the wireless charging. At this time, the power reception coil 44 is positioned below the charging terminal 43 in the vertical direction in the vertical placement posture. In this way, a distance between the power reception coil 44 and the power transmission coil 62 is shortened, and charging efficiency can be improved.

The rectifier 46 converts the AC power received by the power reception coil 44 into the DC power. As shown in FIG. 5, the rectifier 46 according to the present embodiment is a full-wave rectifier circuit in which four diodes D are bridge-connected, and may be a half-wave rectifier circuit.

The AC conductive wire 82 connects the power reception coil 44 and the rectifier 46, and supplies the AC power received by the power reception coil 44 to the rectifier 46. Since the AC power flows through the AC conductive wire 82, heat may be generated due to a skin effect. Here, the skin effect refers to a phenomenon in which, when a high frequency wave is applied to a conductor, an apparent resistance value is increased due to a biased current on a conductor surface.

To describe the rectifier 46 according to the present embodiment more specifically, an anode of a diode D1 and a cathode of a diode D2 are connected to the AC conductive wire 82 extending from one end of the power reception coil 44 at a first connection point P1, and an anode of a diode D3 and a cathode of a diode D4 are connected to the AC conductive wire 82 extending from the other end of the power reception coil 44 at a second connection point P2. Cathodes of diodes D1 and D3 are connected to the positive electrode side DC conductive wire 83 at a third connection point P3, and anodes of diodes D2 and D4 are connected to the negative electrode side DC conductive wire 83 at a fourth connection point P4.

The DC conductive wire 83 connects the rectifier 46 and the charger 13, and supplies the DC power converted by the rectifier 46 to the charger 13 via the common connection line 81 also serving a DC conductive wire. Unlike the AC conductive wire 82, the DC conductive wire 83 does not generate heat due to the skin effect.

Here, a length of the DC conductive wire 83 is preferably equal to or larger than that of the AC conductive wire 82. The DC conductive wire 83 is preferably not the same length as the AC conductive wire 82 but longer than the AC conductive wire 82. In this way, since the AC conductive wire 82 can be shortened, heat generation in the AC conductive wire 82 due to the skin effect and influence of the heat generation in the AC conductive wire 82 on circuit elements can be prevented. In particular, when the magnetic resonance method is used, a temperature of the power reception coil 44 is increased due to the heat generation in the AC conductive wire 82, so that a coupling coefficient between the power transmission coil 62 and the power reception coil 44 is reduced, and power transmission efficiency is reduced. By shortening the AC conductive wire 82, a decrease in the power transmission efficiency can be prevented. The circuit elements include, in addition to the rectifier 46, the charger 13 and circuit elements included in the control unit 50, capacitors and resistors provided on a board (not shown) on which these are mounted.

The AC conductive wire 82 is preferably a Litz wire formed by twisting a plurality of conductive wires (for example, enameled wires). In this way, since cross-sectional area of each conductive wire is reduced, the skin effect of the AC conductive wire 82 can be effectively prevented. Accordingly, the heat generation in the AC conductive wire 82 due to the skin effect and the influence of the heat generation in the AC conductive wire 82 on the circuit elements can be further prevented.

A center of the power reception coil 44 may be a cavity, and components of the power supply unit 10 such as the power supply 12 may be arranged in the cavity, or may be arranged so as to penetrate the cavity. By configuring the power supply unit 10 in this way, a size of the power supply unit 10 can be reduced.

The switch 84 is arranged on the DC conductive wire 83 on a connection path between the power reception coil 44 and the charger 13, and opens and closes the connection path. In the present embodiment, the switch 84 is arranged between the third connection point P3 and the sixth connection point P6. The switch 84 is formed of, for example, a MOSFET, and is controlled to be opened and closed by the control unit 50 adjusting a gate voltage. According to such a switch 84, when both the wireless charging and the wired charging can be performed, the wired charging having better charging efficiency is preferentially performed, and charging time can be shortened. When both the wireless charging and the wired charging can be performed, malfunction can be prevented by cutting off connection between the wireless charging circuit 48 and the charger 13 and exclusively performing the wired charging. Instead of the present embodiment, the switch 84 may be arranged between the fourth connection point P4 and the fifth connection point P5. Two switches 84 may be prepared, one of which is connected between the third connection point P3 and the sixth connection point P6, and the other of which is connected to the fourth connection point P4 and the fifth connection point P5.

Figure 6:
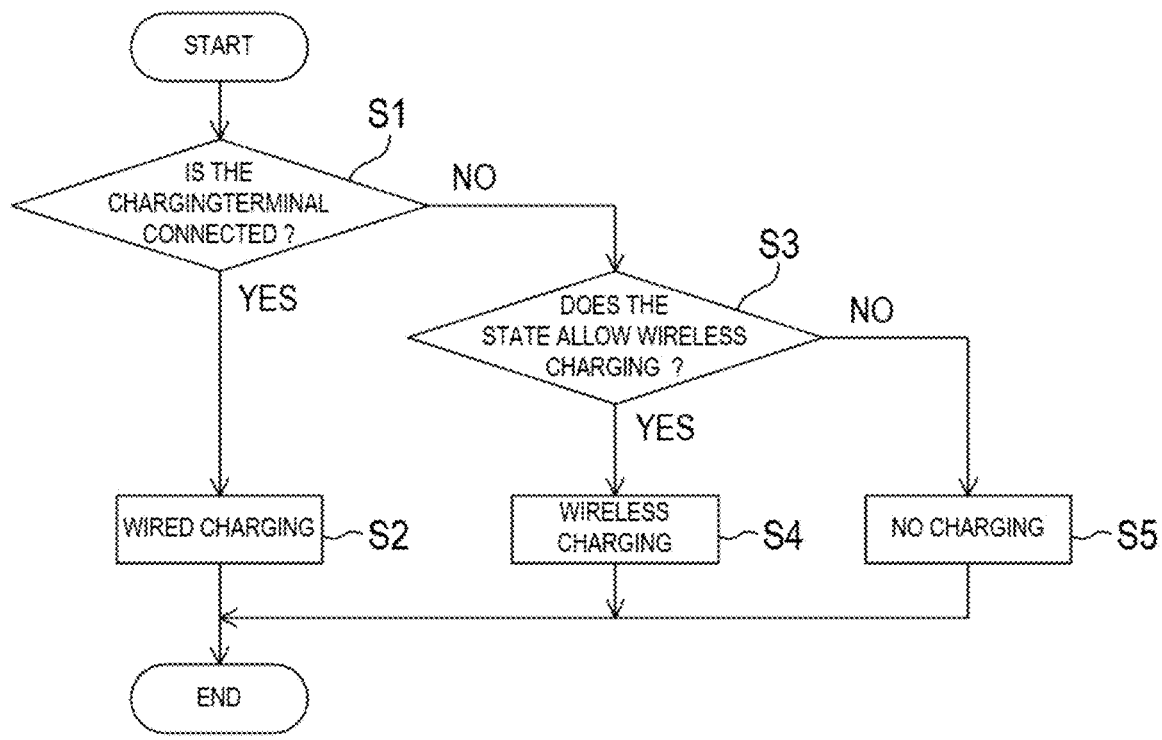
FIG. 6 is a flowchart showing a charging control procedure of the power supply unit of the aerosol inhaler shown in FIG. 1.

To describe a charging control procedure by the control unit 50 specifically, as shown in FIG. 6, the control unit 50 first determines whether the charging terminal 43 is connected to the external power supply 60 (S1). When the determination result is YES, the switch 84 is turned off and the wired charging is exclusively performed (S2). When the determination result of step S1 is NO, the control unit 50 determines whether the power reception coil 44 is in a state capable of wireless charging in which power can be received from the power transmission coil 62 (S3). When the determination result is YES, the switch 84 is turned on and the wireless charging is performed (S4), and when the determination result is NO, the charging is not performed (S5). In step S3, whether the state capable of wireless charging is established is determined based on wireless communication between the control unit 50 of the power supply unit 10 and a wireless charging device including the built-in power transmission coil 62. Alternatively, whether the state capable of wireless charging is established may be determined based on whether the power reception coil 44 is excited.

Next, second to sixth embodiments of the power supply unit 10 will be sequentially described with reference to FIGS. 7 to 11. Note that description of the first embodiment is incorporated by denoting the same configurations as those of the first embodiment with the same reference numerals as in the first embodiment.

Second Embodiment

Figure 7:
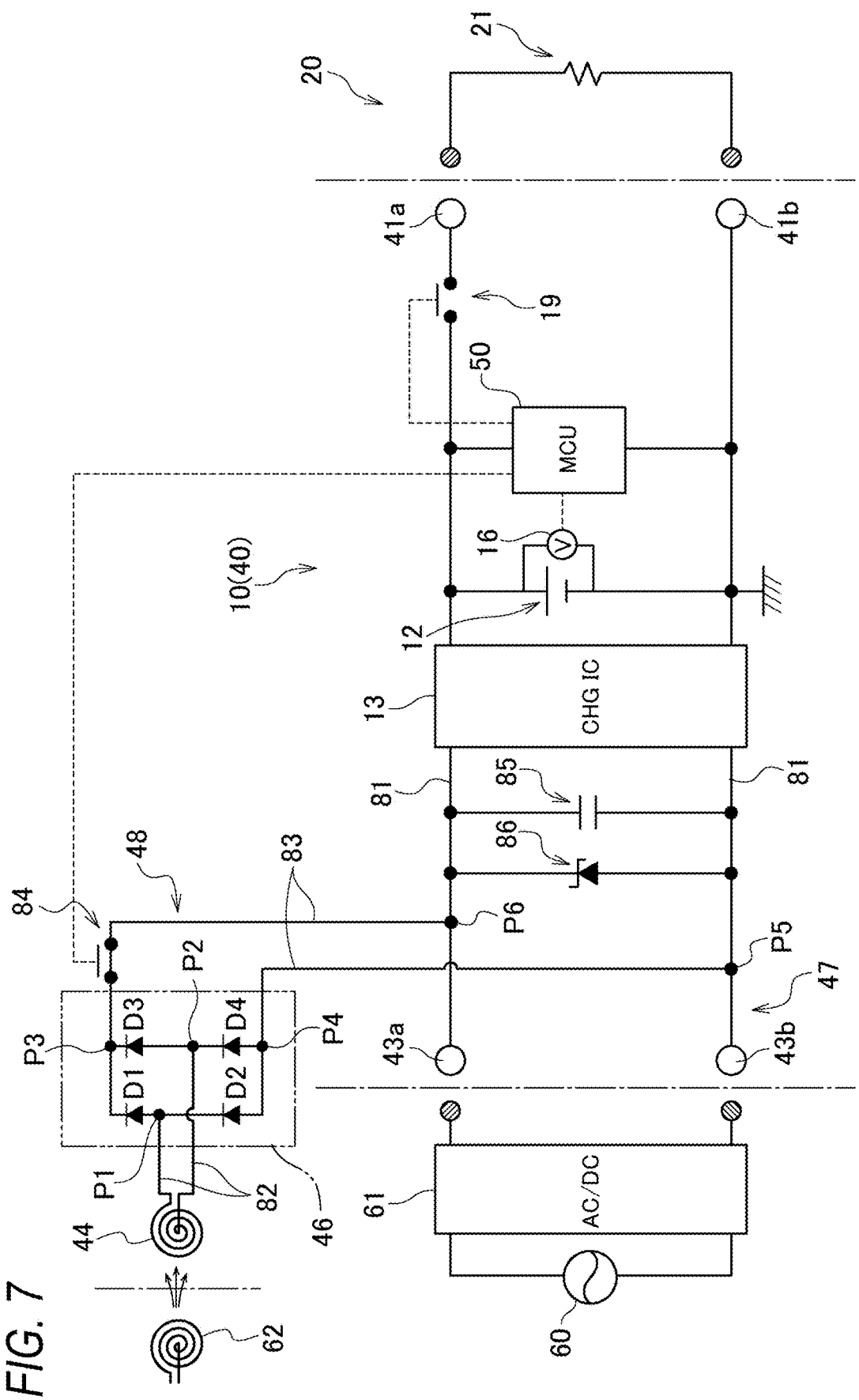
FIG. 7 is a schematic diagram showing a circuit configuration of a power supply unit according to a second embodiment of the present invention.

As shown in FIG. 7, the power supply unit 10 according to the second embodiment is different from that according to the first embodiment in that a smoothing capacitor 85 for ripple removal connected to an input side of the charger 13 and a Zener diode 86 that prevents an excessive voltage from being applied to the charger 13 are provided.

Both the smoothing capacitor 85 and the Zener diode 86 are not necessarily provided, and at least one of the smoothing capacitor 85 and the Zener diode 86 may be provided on the common connection line 81 on the input side of the charger 13. According to such a circuit configuration, since at least one of the smoothing capacitor 85 and the Zener diode 86 is shared in the wired charging and the wireless charging, the power supply unit 10 can be further prevented from increasing in size, weight and cost.

Each of the smoothing capacitor 85 and the Zener diode 86 is configured to be capable of supplying power with which the charger 13 can operate normally in both a case where the wired charging using the charging terminal 43 is performed and a case where the wireless charging using the power reception coil 44 is performed. Specifically, capacity of the smoothing capacitor 85 is set based on a larger ripple of the power supplied from the charging terminal 43 and the power supplied from the power reception coil 44 (the rectifier 46), and a Zener voltage of the Zener diode 86 is set based on a higher transient voltage or a higher steady voltage of the power supplied from the charging terminal 43 and the power supplied from the power reception coil 44 (the rectifier 46). In this way, even when a single smoothing capacitor 85 or Zener diode 86 is used in both the wired charging and the wireless charging, the charger 13 can be appropriately protected while the size and weight of the power supply unit 10 can be reduced.

Third Embodiment

Figure 8:
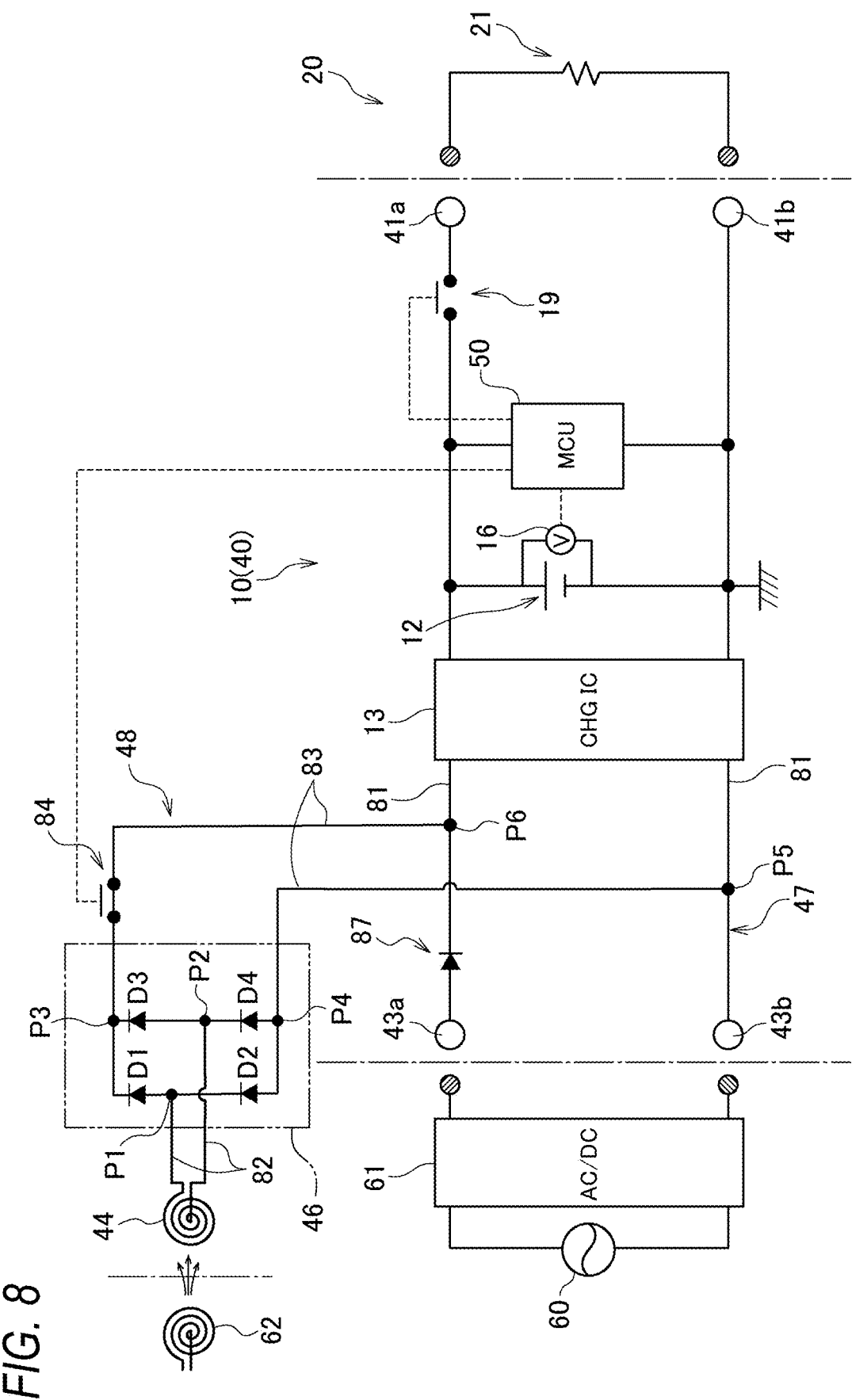
FIG. 8 is a schematic diagram showing a circuit configuration of a power supply unit according to a third embodiment of the present invention.

As shown in FIG. 8, the power supply unit 10 according to the third embodiment is different from that according to the first embodiment in that a diode 87 that regulates the power received during the wireless charging from flowing into a charging terminal 43 side is provided in the wired charging circuit 47. According to such a circuit configuration, malfunction or a decrease in charging efficiency due to the power received during the wireless charging flowing into the charging terminal 43 side can be prevented.

Fourth Embodiment

Figure 9:
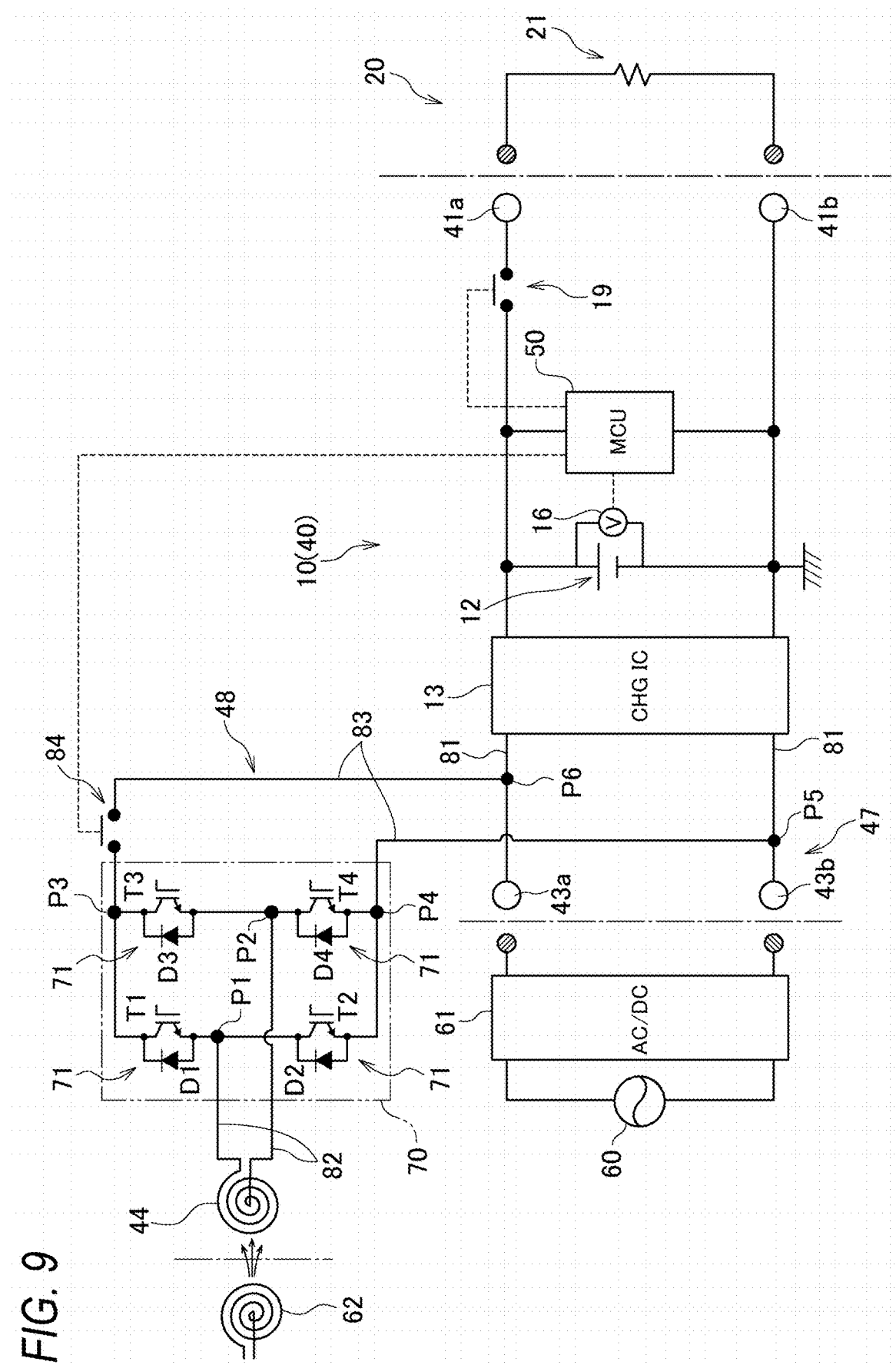
FIG. 9 is a schematic diagram showing a circuit configuration of a power supply unit according to a fourth embodiment of the present invention.

As shown in FIG. 9, the power supply unit 10 according to the fourth embodiment is different from that according to the first embodiment in that an inverter 70 is provided as a converter instead of the rectifier 46. The inverter 70 is formed by bridge-connecting four switching elements 71. The switching element 71 is, for example, a transistor such as an insulated gate bipolar transistor (IGBT) or a metal oxide semi-conductor field effect transistor (MOSFET), and opening and closing control is performed by the control unit 50 adjusting a gate voltage.

To describe the inverter 70 according to the present embodiment more specifically, an emitter of a transistor T1 and a collector of a transistor T2 are connected to the AC conductive wire 82 extending from one end of the power reception coil 44 at the first connection point P1, and an emitter of a transistor T3 and a collector of a transistor T4 are connected to the AC conductive wire 82 extending from the other end of the power reception coil 44 at the second connection point P2. Collectors of the transistor T1 and the transistor T3 are connected to the positive electrode side DC conductive wire 83 at the third connection point P3, and emitters of the transistor T2 and the transistor T4 are connected to the negative electrode side DC conductive wire 83 at the fourth connection point P4. Each of the diodes D1 to D4 connected in a forward direction from the emitter to the collector is provided between the collector and the emitter of each of transistors T1 to T4. Since the inverter 70 is used instead of the rectifier 46, the power reception coil 44 can be used as a power transmission coil.

That is, the power reception coil 44 can be excited by power of the power supply 12 while a power reception coil of the other device is brought close to the power reception coil 44, and the power can be transmitted to the power reception coil of the other device. At this time, the inverter 70 converts DC power supplied from the power supply 12 into AC power by repeating a state where the transistors T1, T4 are turned on and the transistors T2, T3 are turned off and a state where the transistors T1, T4 are turned off and the transistors T2, T3 are turned on. When the inverter 70 converts the AC power received by the power reception coil 44 into the DC power, all the transistors T1 to T4 are controlled to be turned off.

Fifth Embodiment

Figure 10:
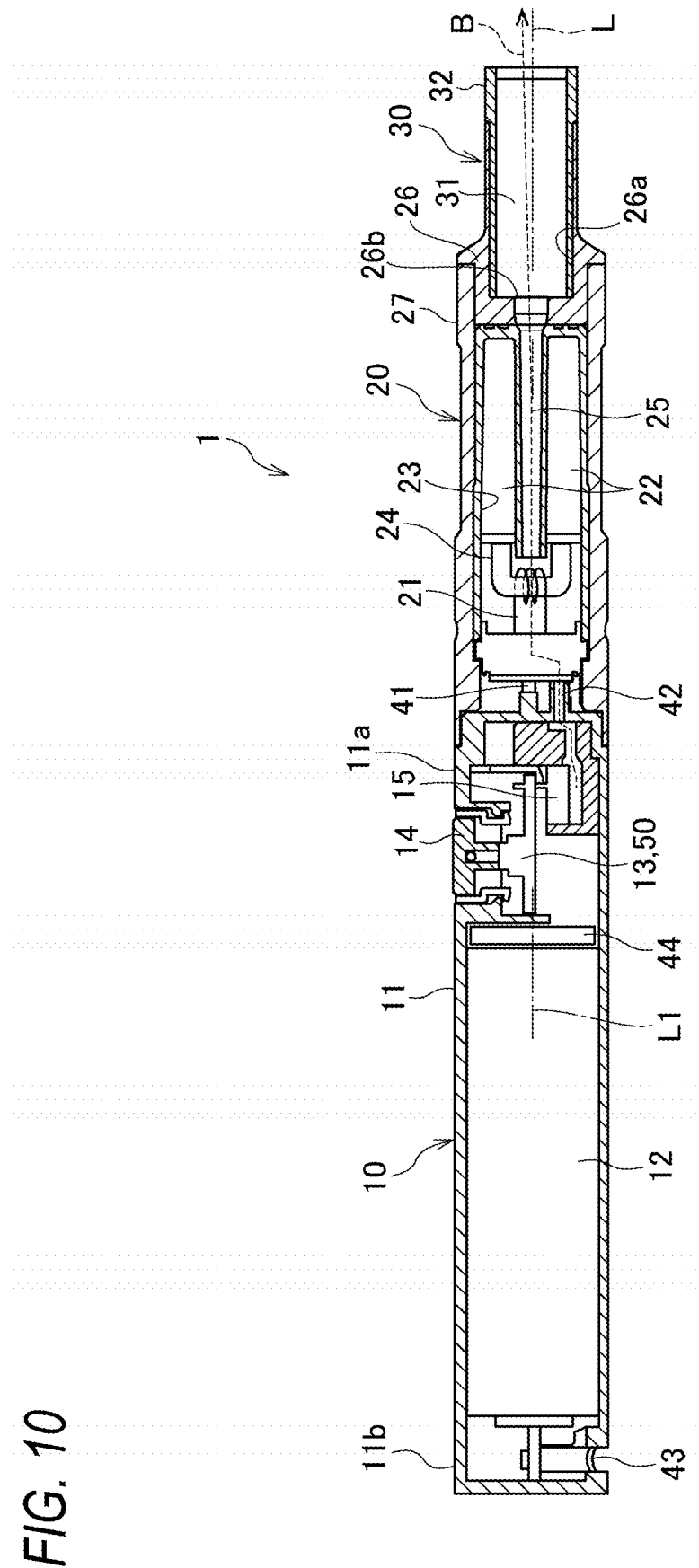
FIG. 10 is a sectional view of an aerosol inhaler equipped with a power supply unit according to a fifth embodiment of the present invention.

As shown in FIG. 10, the power supply unit 10 according to the fifth embodiment is different from that according to the first embodiment in that the power reception coil 44 is arranged above the power supply 12 in the vertical direction and the charging terminal 43 is arranged below the power supply 12 in the vertical direction during the vertical placement.

Figure 13:
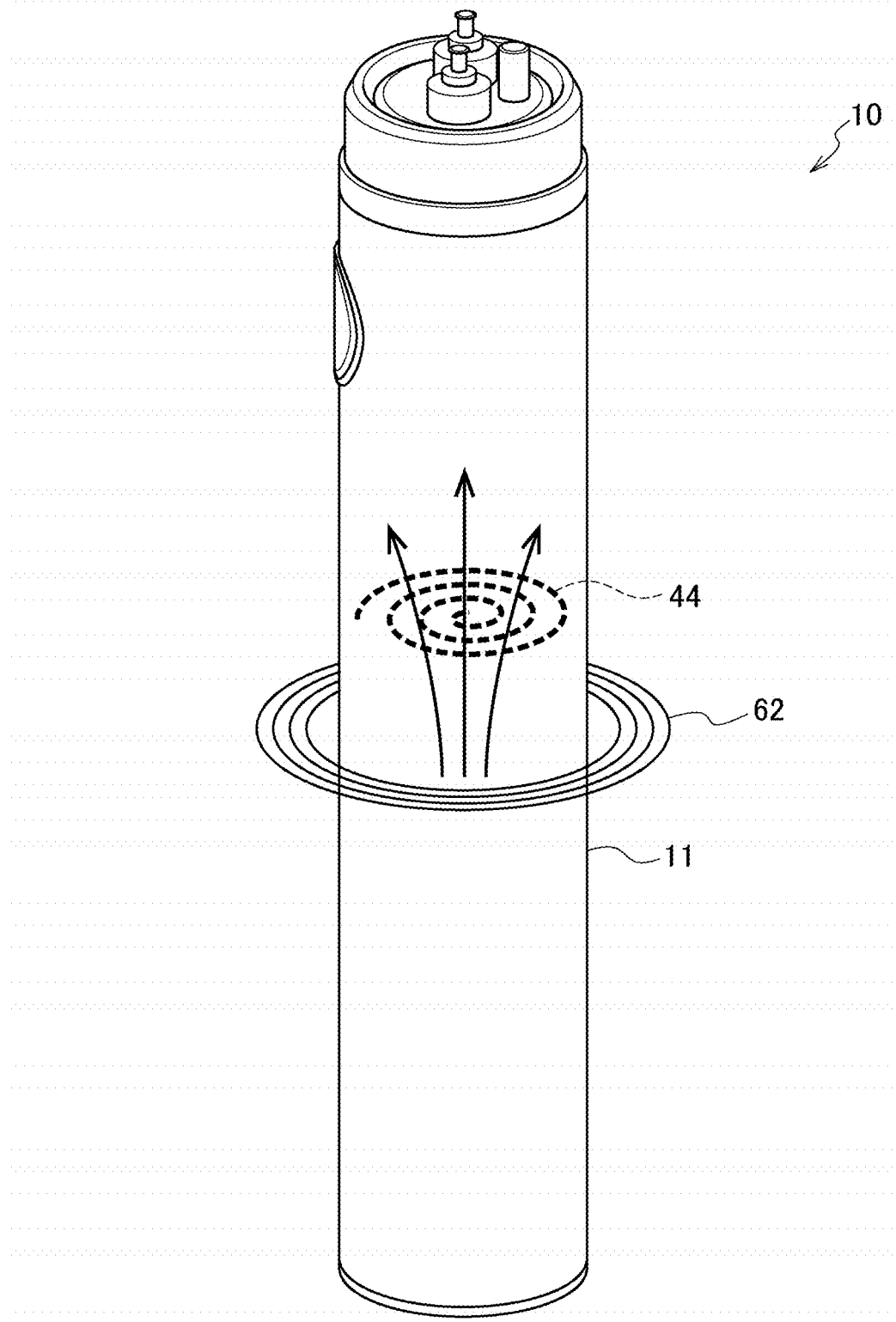
FIG. 13 is a perspective view schematically showing a state of wireless charging of the power supply unit of the aerosol inhaler shown in FIG. 10.

Specifically, the power reception coil 44 is arranged at an intermediate portion of the power supply unit case 11 such that the coil winding axis center line L1 is along the center line L of the power supply unit case 11 in the length direction. When the power supply unit case 11 is placed vertically, as shown in FIG. 13, the power reception coil 44 can receive the power by capturing magnetic flux from the ring-shaped power transmission coil 62 surrounding the intermediate portion of the power supply unit case 11. In other words, when the power supply unit 10 is charged by the power reception coil 44, a charging stand (not shown) including the power transmission coil 62 through which the power supply unit case 11 can penetrate may be used, and the charging mat 63 in the first embodiment may be used. When the charging mat 63 is used, power transfer is preferably performed by the magnetic resonance method.

According to such a power supply unit 10, since the power supply 12 having a larger weight can be arranged below in the vertical direction as compared with a case where the charging terminal 43 and the power reception coil 44 are arranged below the power supply 12 in the vertical direction, a center of gravity of the power supply unit 10 can be prevented from moving upward in the vertical direction, and stability during charging can be improved. Even if a moment is generated by a cable for the wired charging, the power supply unit 10 is less likely to fall down.

Sixth Embodiment

Figure 11:
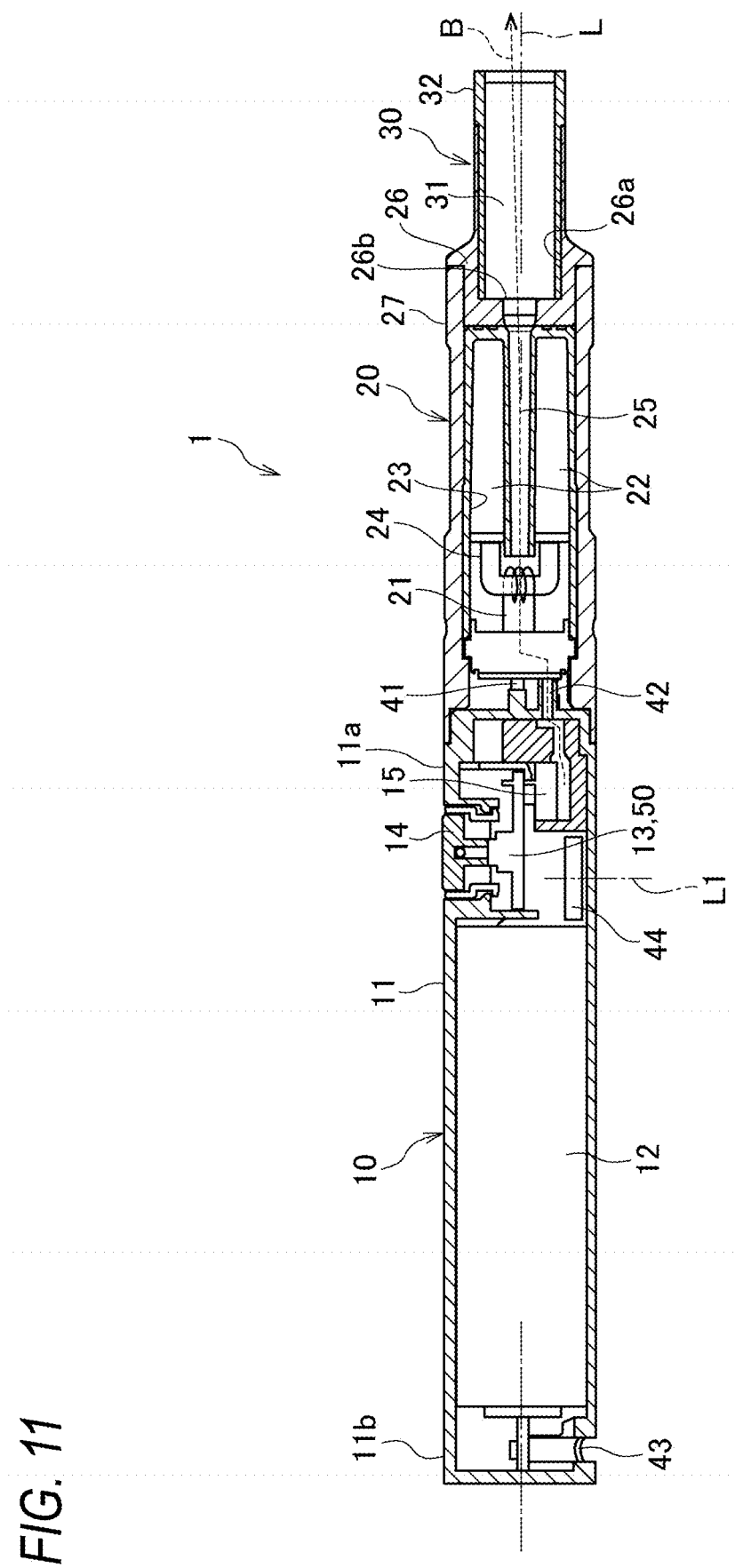
FIG. 11 is a sectional view of an aerosol inhaler equipped with a power supply unit according to a sixth embodiment of the present invention.

As shown in FIG. 11, the power supply unit 10 according to the sixth embodiment is different from that according to the first embodiment in that the power reception coil 44 is arranged such that the wireless charging can be performed when the power supply unit case 11 is placed horizontally (hereinafter referred to as horizontal placement as appropriate). "Horizontally" means that the longitudinal direction is placed in a substantially horizontal direction.

Specifically, the power reception coil 44 is arranged in a substantially intermediate portion (hereinafter simply referred to as an intermediate portion) of the power supply unit case 11 such that the coil winding axis center line L1 extends in a direction orthogonal to the center line L of the power supply unit case 11 in the length direction.

Figure 14:
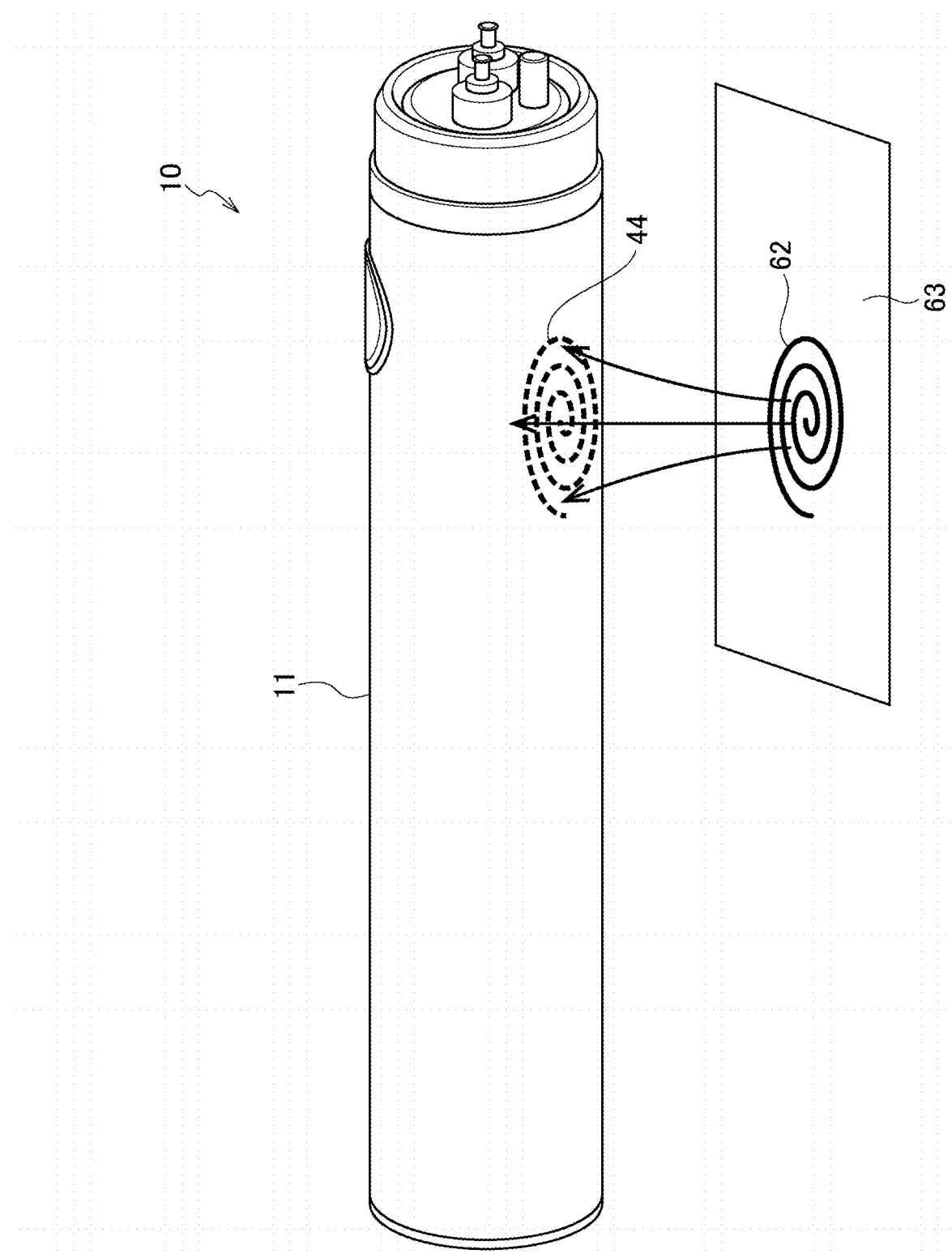
FIG. 14 is a perspective view schematically showing a state of wireless charging of the power supply unit of the aerosol inhaler shown in FIG. 11.

According to such a power supply unit 10, as shown in FIG. 14, since the wireless charging can be performed in a horizontal placement state of the power supply unit case 11, the stability during charging can be improved as compared with a case where the wireless charging is performed in the vertical placement. The power supply unit case 11 is preferably provided with a position regulation portion such that the power supply unit 10 can be maintained within a predetermined angular range in which the power can be received when the power supply unit 10 is placed horizontally.

The present invention is not limited to the above embodiments, and can be appropriately modified, improved and the like. For example, a power reception coil for vertical placement charging and a power reception coil for horizontal placement charging may be provided together.

The present specification describes at least the following matters. Although corresponding constituent elements or the like in the above embodiments are illustrated in parentheses, the present invention is not limited thereto.

(1) A power supply unit (power supply unit 10) for an aerosol inhaler (aerosol inhaler 1) includes: a power supply (power supply 12) capable of supplying power to a load (load 21) capable of generating aerosol from an aerosol source; and a connector (charging terminal 43) serving as a physical and electrical contact with an external power supply (external power supply 60), in which the power supply unit for the aerosol inhaler further includes a power reception coil (power reception coil 44) capable of receiving the power in a wireless manner.

According to (1), since both wireless charging and wired charging can be performed, charging opportunities of the power supply unit can be increased and use restriction due to insufficient charging can be prevented.

(2) The power supply unit for the aerosol inhaler according to (1), further includes: a charging circuit (charge and discharge control circuit 40) configured to enable charging of the power supply, in which when wireless charging using the power reception coil and wired charging using the connector are executable, only one of the wireless charging and the wired charging is performed.

According to (2), since the charging circuit permits only one of the wireless charging and the wired charging, malfunction can be prevented.

(3) The power supply unit for the aerosol inhaler according to (1) or (2) further includes: a charging circuit (charge and discharge control circuit 40) configured to enable the charging of the power supply, in which the charging circuit is configured to perform, when the wireless charging using the power reception coil and the wired charging using the connector are executable, only the wired charging among the wireless charging and the wired charging.

According to (3), when the wireless charging and the wired charging are executable, the charging circuit prioritizes the wired charging having better charging efficiency, and thus can shorten charging time.

(4) The power supply unit for the aerosol inhaler according to any one of (1) to (3), further includes: a charging circuit (charge and discharge control circuit 40) configured to enable the charging of the power supply, in which the charging circuit includes: a node (fifth connection point P5 and sixth connection point P6) electrically connected to the power supply, a first circuit (wireless charging circuit 48) configured to electrically connect the node and the power reception coil, a second circuit (wired charging circuit 47) configured to electrically connect the node and the connector, and a switch (switch 84) provided only in the first circuit among the first circuit and the second circuit.

According to (4), since the switch is provided only in the wireless charging circuit, highly efficient wired charging can be exclusively performed when both the wireless charging and the wired charging can be performed. In addition, exclusive wired charging can be realized with a simple configuration.

(5) The power supply unit for the aerosol inhaler according to (4), in which the charging circuit further includes a diode (diode 87) provided in the second circuit.

According to (5), since the diode is provided in the second circuit serving as the wired charging circuit, the power received in a wireless manner can be prevented from flowing into a connector side.

(6) The power supply unit for the aerosol inhaler according to any one of (1) to (5), further includes: a charger (charger 13) capable of controlling the charging of the power supply, in which the power reception coil and the connector are connected in parallel to the charger.

According to (6), since the power reception coil and the connector are connected to the same charger, the power supply unit can be prevented from increasing in size, weight and cost even if the power supply unit is capable of both the wired charging and wireless charging.

(7) The power supply unit for the aerosol inhaler according to (6), in which a part of a circuit that connects the power reception coil and the charger and a part (common connection line 81) of a circuit that connects the connector and the charger are made common.

According to (7), since a part of the circuit connected to the charger is made common, the power supply unit can be further prevented from increasing in size, weight and cost.

(8) The power supply unit for the aerosol inhaler according to (7), in which the part of the circuit that connects the power reception coil and the charger and the part of the circuit that connects the connector and the charger are formed on the same flexible printed circuit board.

According to (8), by using the flexible printed circuit board, it is possible to improve degree of freedom of arrangement while preventing the power supply unit from increasing in size, weight and cost.

(9) The power supply unit for the aerosol inhaler according to any one of (6) to (8), further includes: at least one of a smoothing capacitor (smoothing capacitor 85) and a Zener diode (Zener diode 86) connected to an input side of the charger, in which the power reception coil and the connector are connected in parallel to at least one of the smoothing capacitor and the Zener diode.

According to (9), since at least one of the smoothing capacitor and the Zener diode is shared, the power supply unit can be further prevented from increasing in size, weight and cost.

(10) The power supply unit for the aerosol inhaler according to (9), in which at least one of the smoothing capacitor and the Zener diode is configured to be capable of supplying the power with which the charger can operate normally in both a case where the wireless charging using the power reception coil is performed and a case where the wired charging using the connector is performed.

According to (10), since at least one of the smoothing capacitor and the Zener diode is combined with charging power required to be further improved, even when a single smoothing capacitor or Zener diode is used, the charger can be appropriately protected while the size and weight of the power supply unit can be reduced.

(11) The power supply unit for the aerosol inhaler according to (9), in which capacity of the smoothing capacitor is set based on one, having a larger ripple, of the power supplied from the power reception coil and the power supplied from the connector, and/or a Zener voltage of the Zener diode is set based on one, having a higher transient voltage or a higher steady voltage, of the power supplied from the power reception coil and the power supplied from the connector.

According to (11), even when a single smoothing capacitor or Zener diode is used, the charger can be appropriately protected while the size and weight of the power supply unit can be reduced.

(12) The power supply unit for the aerosol inhaler according to any one of (1) to (11), further includes: a housing (power supply unit case 11) configured to accommodate the power supply and the power reception coil, in which the connector is formed in the housing, in which the power reception coil is arranged above the power supply in a vertical direction when the power supply is charged, and in which the connector is arranged below the power supply in the vertical direction when the power supply is charged.

According to (12), since the power reception coil is arranged above the power supply in the vertical direction and the connector is arranged below the power supply in the vertical direction, a center of gravity of the power supply unit can be prevented from moving upward in the vertical direction. In addition, even if a moment is generated by a cable for the wired charging, the power supply unit is less likely to fall down.

(13) The power supply unit for the aerosol inhaler according to any one of (1) to (11), further includes: a housing (power supply unit case 11) configured to accommodate the power supply and the power reception coil, in which the power reception coil and the connector are arranged below the power supply in a vertical direction when the power supply is charged, and in which the power reception coil is positioned below the connector in the vertical direction when the power supply is charged.

According to (13), since the power reception coil and the connector are arranged below the power supply in the vertical direction and the power reception coil is arranged below the connector, a distance between the power reception coil and a power transmission coil is shortened, and charging efficiency is improved. Further, elements can be arranged in a concentrated manner, which contributes to wire saving and space saving.

What is claimed is:

1. A power supply unit for an aerosol inhaler comprising:
   a power supply capable of supplying power to a load capable of generating aerosol from an aerosol source; and
   a connector serving as a physical and electrical contact with an external power supply,
   wherein the power supply unit for the aerosol inhaler further comprises:
   a power reception coil capable of receiving the power in a wireless manner; and
   a charging circuit configured to enable the charging of the power supply,
   wherein the charging circuit includes:
   a node electrically connected to the power supply,
   a first circuit configured to electrically connect the node and the power reception coil,
   a second circuit configured to electrically connect the node and the connector, and
   a switch provided only in the first circuit among the first circuit and the second circuit.

2. The power supply unit for the aerosol inhaler according to claim 1, further comprising:
   a control unit configured to determine that wired charging using the connector are executable when the external power supply is connected with the connector,
   wherein the control unit is configured to control the charging circuit such that, when wireless charging using the power reception coil and the wired charging using the connector are executable, only one of the wireless charging and the wired charging is performed.

3. The power supply unit for the aerosol inhaler according to claim 1, further comprising:

a control unit configured to determine that wired charging using the connector are executable when the external power supply is connected with the connector, wherein the control unit is configured to control the charging circuit such that, when wireless charging using the power reception coil and the wired charging using the connector are executable, only the wired charging among the wireless charging and the wired charging is performed.

4. The power supply unit for the aerosol inhaler according to claim 1, wherein the charging circuit further includes a diode provided in the second circuit.

5. The power supply unit for the aerosol inhaler according to claim 1, further comprising:

a charger capable of controlling the charging of the power supply, wherein the power reception coil and the connector are connected in parallel to the charger.

6. The power supply unit for the aerosol inhaler according to claim 5, wherein a part of a circuit that connects the power reception coil and the charger and a part of a circuit that connects the connector and the charger are made common.

7. The power supply unit for the aerosol inhaler according to claim 6, wherein the part of the circuit that connects the power reception coil and the charger and the part of the circuit that connects the connector and the charger are formed on the same flexible printed circuit board.

8. The power supply unit for the aerosol inhaler according to claim 5, further comprising:

at least one of a smoothing capacitor and a Zener diode connected to an input side of the charger, wherein the power reception coil and the connector are connected in parallel to at least one of the smoothing capacitor and the Zener diode.

9. The power supply unit for the aerosol inhaler according to claim 8, wherein at least one of the smoothing capacitor and the Zener diode is configured to be capable of supplying the power with which the charger can operate normally in both a case where the wireless charging using the power reception coil is performed and a case where the wired charging using the connector is performed.

10. The power supply unit for the aerosol inhaler according to claim 8, wherein capacity of the smoothing capacitor is set based on one, having a larger ripple, of the power supplied from the power reception coil and the power supplied from the connector, and/or a Zener voltage of the Zener diode is set based on one, having a higher transient voltage or a higher steady voltage, of the power supplied from the power reception coil and the power supplied from the connector.

11. The power supply unit for the aerosol inhaler according to claim 1, further comprising:

a housing accommodating the power supply and the power reception coil, wherein the connector is provided in the housing, wherein the power reception coil is arranged above the power supply in a vertical direction when the power supply is charged, and wherein the connector is arranged below the power supply in the vertical direction when the power supply is charged.

12. The power supply unit for the aerosol inhaler according to claim 1, further comprising:

a housing accommodating the power supply and the power reception coil, wherein the power reception coil and the connector are arranged below the power supply in a vertical direction when the power supply is charged, and wherein the power reception coil is arranged below the connector in the vertical direction when the power supply is charged.

13. A power supply unit for an aerosol inhaler comprising:

a power supply capable of supplying power to a load capable of generating aerosol from an aerosol source; and a connector serving as a physical and electrical contact with an external power supply, wherein the power supply unit for the aerosol inhaler further comprises:

a power reception coil capable of receiving the power in a wireless manner; and a housing accommodating the power supply and the power reception coil, wherein the connector is provided in the housing, wherein the power reception coil is arranged above the power supply in a vertical direction when the power supply is charged, and wherein the connector is arranged below the power supply in the vertical direction when the power supply is charged.

14. A power supply unit for an aerosol inhaler comprising:

a power supply capable of supplying power to a load capable of generating aerosol from an aerosol source; and a connector serving as a physical and electrical contact with an external power supply, wherein the power supply unit for the aerosol inhaler further comprises:

a power reception coil capable of receiving the power in a wireless manner; and a housing accommodating the power supply and the power reception coil, wherein the connector is provided in the housing, wherein the power reception coil and the connector are arranged below the power supply in a vertical direction when the power supply is charged, and wherein the power reception coil is arranged below the connector in the vertical direction when the power supply is charged.

\* \* \* \* \*